(12) United States Patent
Wada et al.

(10) Patent No.: US 6,744,461 B1
(45) Date of Patent: Jun. 1, 2004

(54) MONITOR CAMERA SYSTEM AND METHOD OF DISPLAYING PICTURE FROM MONITOR CAMERA THEREOF

(75) Inventors: Jyoji Wada, Yokohama (JP); Koji Wakiyama, Yokohama (JP); Ken Ikoma, Yokohama (JP); Haruo Kogane, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 728 days.

(21) Appl. No.: 09/649,173

(22) Filed: Aug. 29, 2000

(30) Foreign Application Priority Data

Aug. 31, 1999 (JP) .............................. 11-246194

(51) Int. Cl.$^7$ .............................. H04N 7/18; G06K 9/00
(52) U.S. Cl. .......................... 348/143; 348/169; 382/103
(58) Field of Search ................................ 348/143, 159, 348/211.11, 211.15, 144, 161, 153, 151, 150, 152; 382/103

(56) References Cited

U.S. PATENT DOCUMENTS 4,992,866 A * 2/1991 Morgan ...................... 348/159
5,801,770 A * 9/1998 Paff et al. .................. 348/211.5
5,808,670 A * 9/1998 Oyashiki et al. ............ 348/143
6,208,379 B1 * 3/2001 Oya et al. ............... 348/211.11
6,337,709 B1 * 1/2002 Yamaashi et al. ........... 348/143

FOREIGN PATENT DOCUMENTS

| JP | 5-130491 | 5/1993 |
| JP | 5-153458 | 6/1993 |
| JP | 8-212465 | 8/1996 |

* cited by examiner

Primary Examiner—Gims Philippe
(74) Attorney, Agent, or Firm—McDermott, Will & Emery

(57) ABSTRACT

In a monitor camera system comprising a monitor camera making 360-degree panning rotation and more-than 90-degree tilting rotation and a control unit for controlling the monitor camera, for masking a privacy zone in a picture taken by the monitor camera, the control unit sets mask data through the use of a contour parameter of a configuration of a mask zone for covering the privacy zone, while the monitor camera side holds the mask data to mask a portion of the picture with the mask zone defined on the basis of the mask data. According to this monitor camera system, since only a portion of the picture is masked with the mask zone, it is possible to protect the privacy from the picture taken by the monitor camera without impairing the monitoring function. In addition, since the monitor camera side holds the mask data, quick processing becomes feasible.

23 Claims, 12 Drawing Sheets

FIG. 4B    HLy, LLy, HRy, HLx, LLx, HRy tHLy=LLy
tLLy=HLy
tHRy=LRy=LLy
tLRy=HRy tLLx=LRx=HRx
tLRx=LLx
tHLx=HRx
tHRx=HLx

MONITOR CAMERA SYSTEM AND METHOD OF DISPLAYING PICTURE FROM MONITOR CAMERA THEREOF

BACKGROUND OF THE INVENTION

1. Field of the Invention

The present invention relates to a monitor (surveillance) camera system (or apparatus) covering 360-degree monitoring area and a method of displaying an image from the same, and more particularly to a monitor camera system and a camera picture displaying method, which are capable of producing a display so that a portion of an image is masked for the purpose of the protection of privacy.

2. Description of the Related Art

So far, a monitor camera in which a camera and a rotatable table therefor are placed in a dome-like housing has been put on the market. This monitor camera is called a "compound camera" because of the camera being capable of, through movements of the rotatable tables, rotating horizontally (pan) while rotating vertically (tilt). The compound camera can rotate through 360 degrees without limitation in the pan directions, while rotating in an angular range between 0 degree and 90 degrees, that is, from a horizontal direction to a vertical direction, in the tilt directions. In addition, through the manipulation of a controller, this compound camera can take a photograph at a desired angle or in a desired direction in a state installed on a ceiling of public facilities or the like. Still additionally, even if a target subject passes right under it, as FIG. 15 shows, immediately a camera 10 turns to right under, it can rotate 180 degrees around a lens thereof to chase the target subject continuously, thus providing pictures throughout a monitoring area.

FIG. 13 is an illustration of a state in which a controller 12 for controlling a compound camera 11 and a monitor 13 for displaying a picture taken through the compound camera 11 are connected through a coaxial cable 16 to the compound camera 11. The controller 12 functions as a control element and comprises a joystick 14 and a numeric pad (numeric keys) 15.

This compound camera 11 is designed so that a plurality of camera positions, for example, taking a direction to an entrance, a direction to an exit and a direction to a window, are preset in the controller 12 in the form of identification numbers (ID). After preset, simply by inputting the ID corresponding to a camera position through the use of the numeric pad 15, the camera can be turned to take the preset direction.

In addition, the joystick 14 of the controller 12 is manipulated for controlling the moving (rotating) speed of the camera 11. When the joystick 14 is tilted, as shown in FIG. 14, the camera 11 rotates in a tilting direction at a speed proportional to the movement component of the joystick 14 in the vertical-axis direction and rotates in a panning direction at a speed proportional to the movement component thereof in the horizontal-axis direction. An operator checks pictures while viewing the monitor 13 and, when the rotating camera 11 catches a desired direction, the operator returns the joystick 14 to the neutral position to stop the rotations thereof in the tilting and panning directions.

Furthermore, when such a camera is installed to monitor a public place, the camera has a function whereby limitation is imposed on the angle of rotation of that camera so that neighboring private houses do not appear on the screen (scene) or has a picture processing function whereby, if the camera develops a picture of the private houses, the picture thereof entirely turns black, thereby accomplishing the protection of privacy.

However, with the conventional privacy protecting method for use in a monitor camera system, a picture other than an area undergoing the protection also disappears because limitation is imposed on photographing direction or the entire picture turns black, which causes impairment of the monitoring function.

Meanwhile, a group including the inventors of the present invention has developed a new compound camera capable of rotating 180 degrees in tilting directions while limitlessly rotating 360 degrees in panning directions. Although this compound camera can provide the increased degree of freedom in moving direction to functionally monitor a wider range, there is an additional need for a method to accomplish the privacy protection without reflecting on the monitoring function.

SUMMARY OF THE INVENTION

Accordingly, the present invention has been developed with a view to eliminating the above-mentioned problems, and it is an object of the invention to provide a monitor camera system and camera picture displaying method which are capable of protecting privacy from a camera picture without interfering with a monitoring function.

For this purpose, in accordance with an aspect of the present invention, a monitor camera system comprises a monitor camera ratatable in panning directions and in tilting directions and control means for controlling the monitor camera, the monitor camera holding mask data to be used in masking a privacy zone in a picture taken by the monitor camera, while the control means masking a portion of said picture corresponding to said privacy zone on the basis of the mask data.

In this case, the control means sets the mask data through the use of a contour parameter of a configuration of a mask zone for covering the privacy zone. More specifically, for setting the mask data, the control means uses, as the contour parameter, center coordinates and size coefficient of the mask zone configuration, center coordinates of said mask zone configuration and a radius of said mask zone configuration, or coordinates of a left upper vertex and a right lower vertex of the mask zone configuration. In addition, the setting of the mask data is made on a central portion of the picture taken by said monitor camera.

Alternatively, in the monitor camera system, the monitor camera holds the mask data produced on the basis of center coordinates and one or more contour size parameters of the mask zone configuration.

Furthermore, in the monitor camera system, the masking is inhibited in a region in which a tilt angle is below a predetermined value, and the control means manages the number of masks included in one scene taken by the monitor camera, and inhibits the setting of masks, whose number exceeds a predetermined value, in the one scene.

Still furthermore, in the monitor camera system, the mask data, together with a number or name indicative of a mask zone for covering the privacy zone, is held in the monitor camera, and when receiving the number or name from the control means, the monitor camera provides a display of a mask zone determined by the mask data held together with the number or name. That is, when receiving the number or name from the control means in a mask correction mode, the monitor camera provides a display of a mask zone corresponding to the number or name. Additionally, the monitor camera inverts vertically the mask data held therein when masking said privacy zone.

Moreover, the setting or cancellation of the mask data is made only when a password is inputted to said control means, and a position of a mask zone for covering the privacy zone deviates from a central position of a screen displaying a picture taken by the monitor camera, the monitor camera corrects the configuration of the mask zone. Additionally, when a plurality of mask zones appears in one scene, the monitor camera converts the plurality of mask zones into one enlarged mask zone prior to masking processing.

Still moreover, in a case in which a mask zone is set on a screen for displaying a picture taken by the monitor camera, the control means controls a moving speed of the monitor camera to a mask processing ability.

In addition, in accordance with another aspect of the present invention, there is provided a method of displaying a picture taken by a monitor camera ratatable in panning directions and in tilting directions, the method comprising a step of masking a portion of the picture corresponding to a privacy zone on the basis of mask data set through the use of a contour parameter of a configuration of a mask zone for covering the privacy zone.

In the picture display method, the masking is inhibited in a region in which a tilt angle is below a predetermined value, and when the mask zone deviates from a central portion of a screen for displaying the picture taken by the monitor camera, the mask zone configuration is corrected and displayed to cover the entire privacy zone. Additionally, the masking is stopped when a moving speed of the monitor camera exceeds a predetermined value.

Furthermore, in the picture display method, a number or name (character or symbol) is related to said mask data to be displayed together with said mask zone, and the mask zone is displayed in response to an input of the number or name for correction of the mask zone.

BRIEF DESCRIPTION OF THE DRAWINGS

Other objects and features of the present invention will become more readily apparent from the following detailed description of the preferred embodiments taken in conjunction with the accompanying drawings in which:

FIGS. 4A and 4B are illustrations useful for explaining the coordinate of a masking zone in the compound camera picture displaying method according to the embodiment of the invention;

DETAILED DESCRIPTION OF THE INVENTION

Embodiments of the present invention will be described hereinbelow with reference to the drawings.

Figure 9:
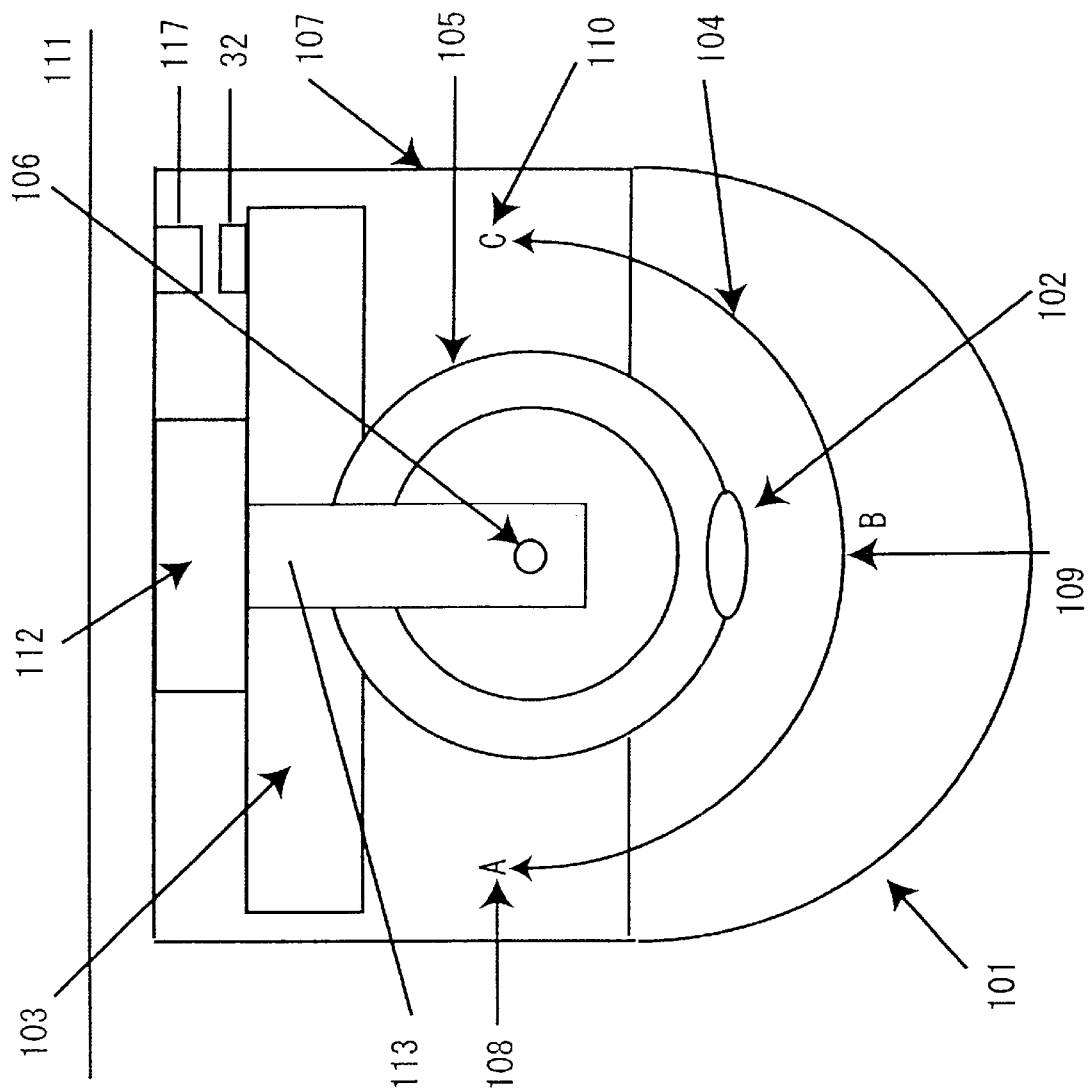
FIG. 9 is a side cross-sectional view showing a construction of the compound camera according to the embodiment of the invention.
Figure 10:
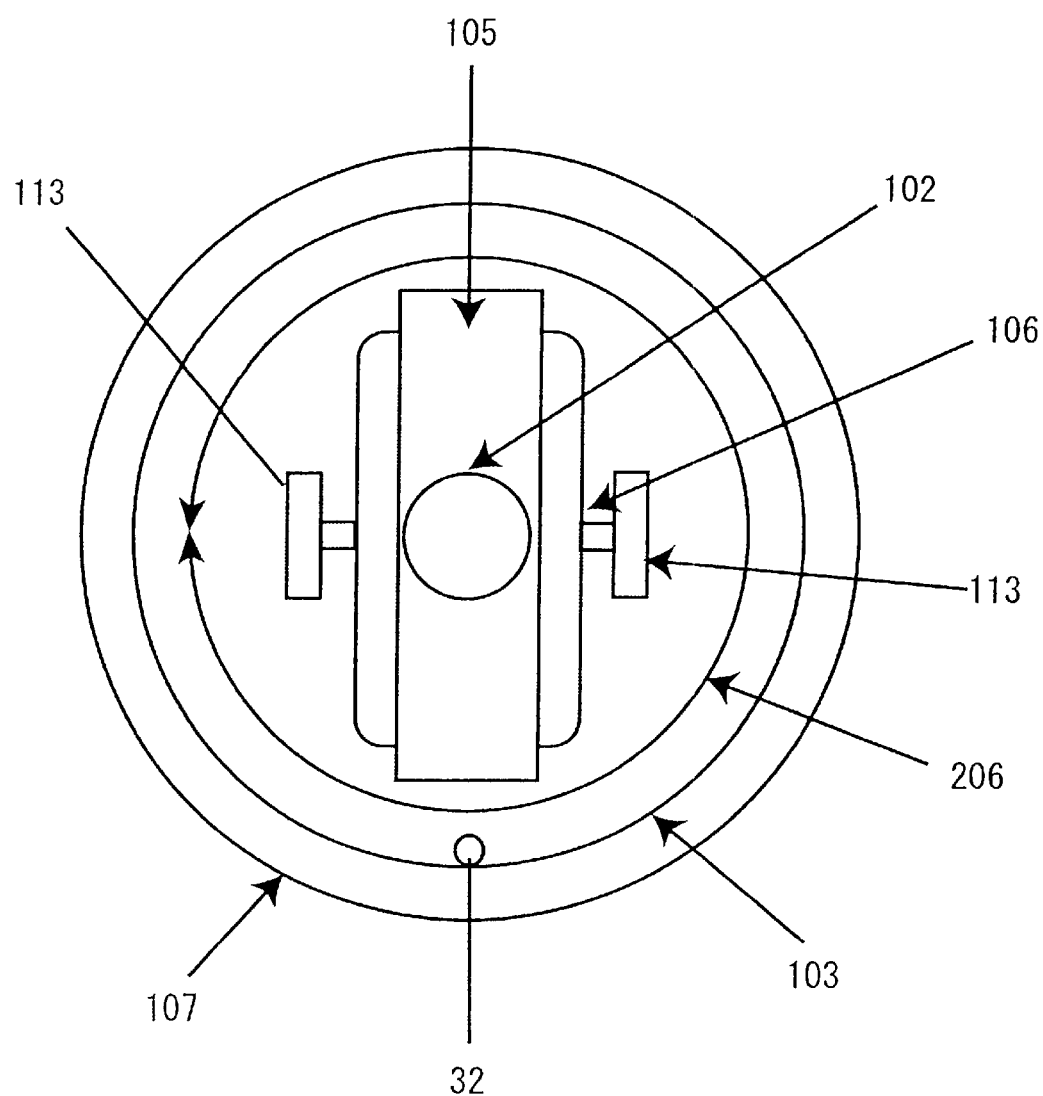
FIG. 10 is a plan cross-sectional view showing the construction of the compound camera according to the embodiment of the invention.

As the side cross-sectional view of FIG. 9 and the plan view of FIG. 10 show, in a compound camera system according to an embodiment of the invention, as a compound camera, a housing comprising a cylindrical camera base 107 and a semi-spherical camera cover 101 accommodates a monitor camera 102, a rotatable tilt table 105 for holding the camera 102 directly, a rotatable pan table 103 capable of limitlessly rotating 360 degrees, a pair of columns 113 planted on the rotatable pan table 103, a tilt rotary shaft 106 for rotatably supporting the rotatable tilt table 105 with respect to the columns 113, and a slip ring 112 acting as a contact for supply of power into the housing or for input/output of electrical signals. Although omitted from the illustration, the compound camera is additionally equipped with a rotating mechanism for the rotatable pan table 103 and the rotatable tilt table 104, a motor functioning as a rotational drive source, a drive control section for the motor, an amplifying circuit for amplifying video signals, and a control section for controlling an operation of the compound camera system. In addition, a magnet 117 is fixed at an origin position for determining the origin of rotation in the panning direction, while a home-position (origin) Hall element 32 is placed on the rotatable pan table 103 for detecting a magnetic field from the magnet 117.

The rotatable tilt table 105, holding the camera 102, is rotatable through 180 degrees around the tilt rotary shaft 106 and, therefore, the camera 102 is reversibly rotatable from a point A (designated at numeral 108 in FIG. 9) through a lowermost point B (designated at numeral 109 in FIG. 9) to a point C (designated at numeral 110 in FIG. 9).

On the other hand, the rotatable pan table 103 is rotatable horizontally through 360 degrees as indicated by a rotation locus (designated at numeral 206 in FIG. 10).

Furthermore, the slip ring 112 realizes the supply of power from a fixed section to a moving section and the communication of electric signals between the fixed section and the moving section in the compound camera system.

Accordingly, when this compound camera is installed, for example, on a ceiling 111, the camera 102 takes a photograph on a monitoring area in all directions in a manner that the angle of rotation of the rotatable tilt table 105 is controlled remotely and the rotatable pan table 103 is rotated in a predetermined direction.

Figure 11:
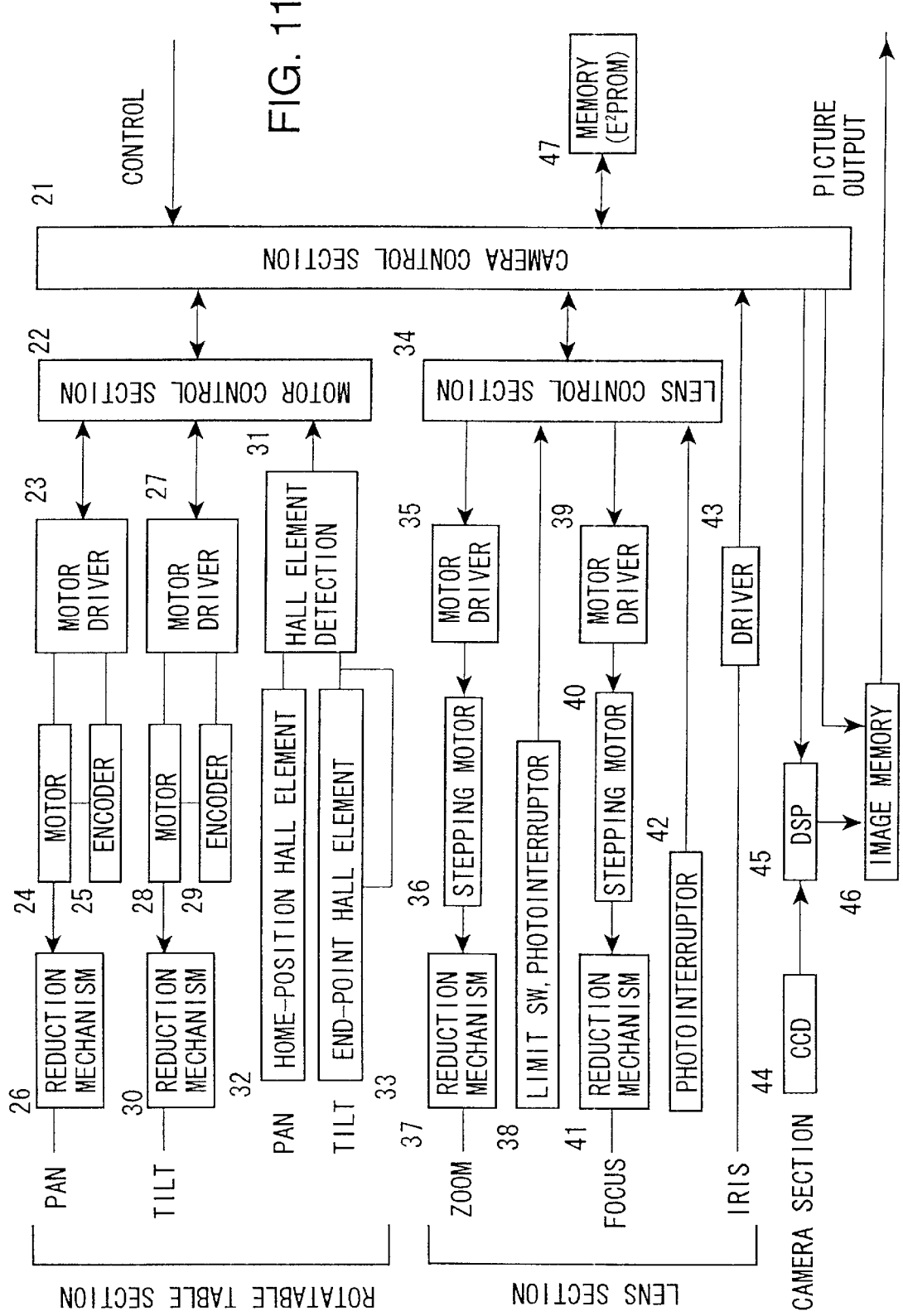
FIG. 11 is a block diagram showing a configuration of the compound camera according to the embodiment of the invention.

FIG. 11 is a functional block diagram showing an internal configuration of the compound camera. As a rotation control mechanism for the rotatable pan table 103 and the rotatable tilt table 105, there are provided motors 24, 28, encoders 25, 29 for detecting speeds of rotation (revolutions) of the motors 24, 28 motor drivers 23, 27 for driving the motors 24, 28 on the basis of the detection results of the encoders 25, 29, reduction mechanisms 26, 30 for reduction of the rotation of the motors 24, 28 to transmit the reduced rotations to the rotatable pan table 103 and the rotatable tilt table 105, respectively, an origin Hall element 32 placed on the rotatable pan table 103 and sensitive to a magnetic field of the magnet 117 situated at the pan origin, end-point Hall elements 33 located 180 degrees apart on the rotatable tilt table 105 and sensitive to magnetic fields of magnets placed at tilt end-point positions, a Hall element signal detecting section 31 for detecting the pan origin and the tilt end points on the basis of detection signals from the Hall elements 32, 33, and a motor control section 22 for controlling the motor drivers 23, 27 in accordance with the detection results of the Hall element detecting section 31.

In addition, as a control mechanism for a camera lens section, there are provided stepping (stepper) motors 36, 40 for zoom and focus adjustments, motor drivers 35, 39 for outputting drive pulses to the stepping motors 36, 40, respectively, reduction mechanisms 37, 41 for reducing the rotations of the stepping motors 36, 40 to transmit the reduced rotations to lens mechanisms, respectively, a limit switch (or photointerruptor) 38 for detecting the limit of the zoom adjustment, a photointerruptor 42 for detecting the limit of the focus adjustment, a lens control section 34 for controlling the motor drivers 35, 39, and a driver 43 for adjusting the iris.

Still additionally, a camera section, outputting a video signal, is composed of an image pickup device (CCD) 44, a DSP 45 for encoding a video signal, and an image memory 46 in and from which image data is writable and readable.

Moreover, in the compound camera system, are included a camera control section 21 for controlling an operation of the compound camera system in accordance with a control signal from a controller (not shown) and a memory (E$^2$PROM) 47 for storing data.

Figure 12:
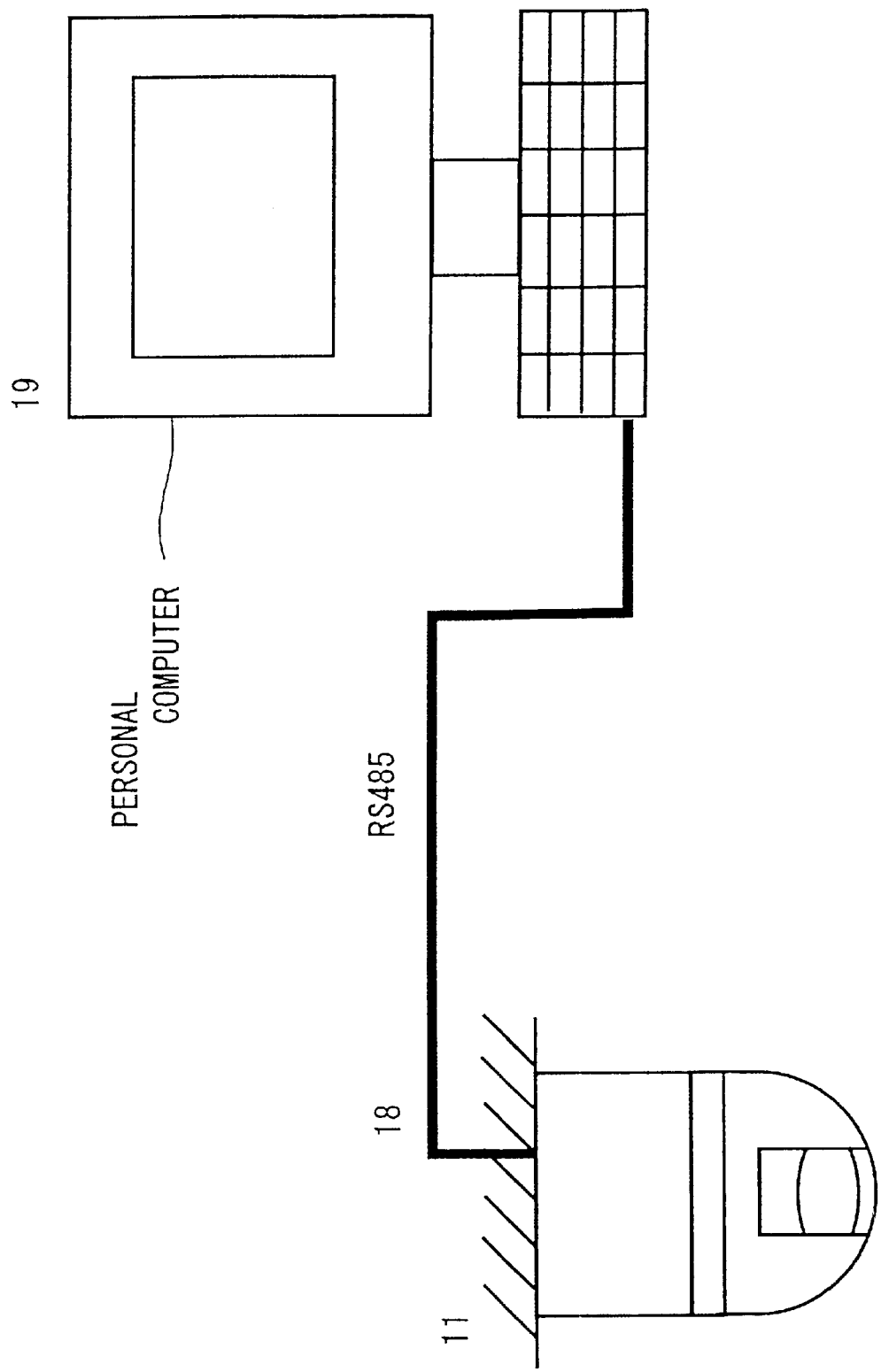
FIG. 12 is an illustration of another control system in the compound camera system according to the invention.
Figure 13:
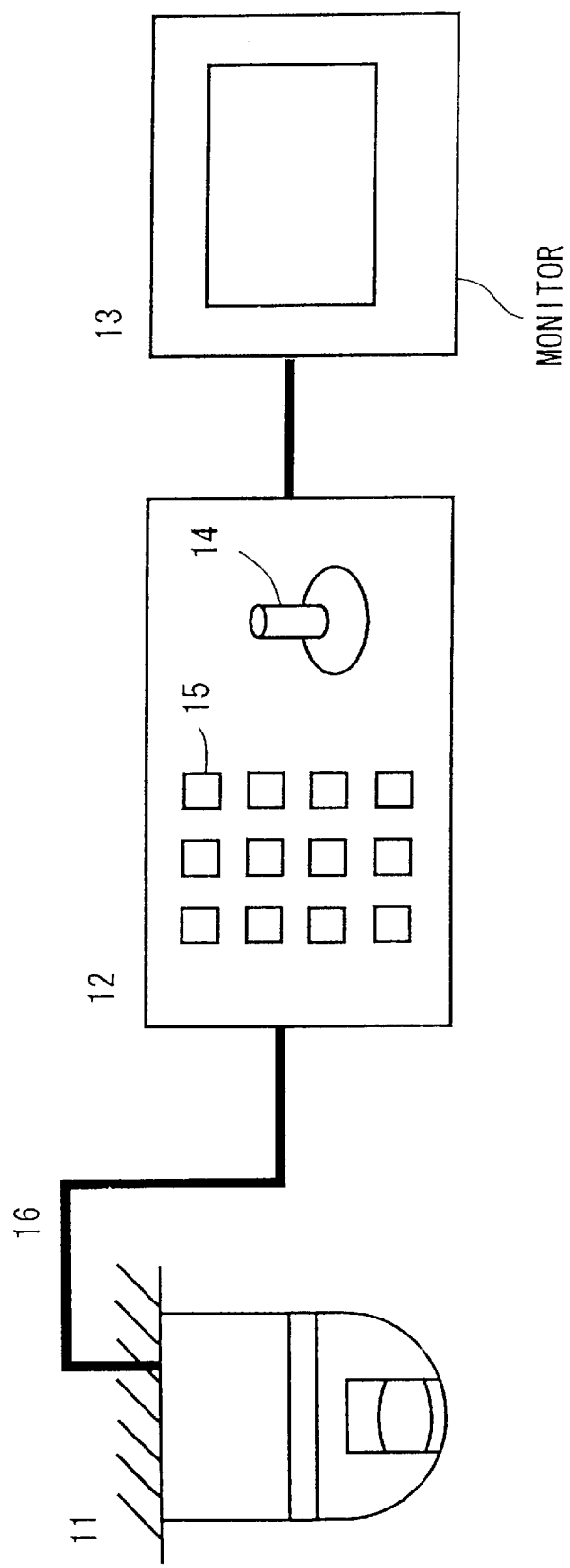
FIG. 13 is an illustration of a control system of a compound camera system.

Still moreover, for example, the compound camera can be controlled in a state connected through a coaxial cable 16 to a controller 12 and a monitor 13 as well as the system shown in FIG. 13, or as shown in FIG. 12, it can be connected through RS485 serial communication 18 to a personal computer 19 so that a compound camera 11 is controlled by the personal computer 19 with a picture taken by the compound camera 11 and displayed on a screen of the personal computer 19.

In the illustration, although one compound camera 11 is connected to the controller 12, it is also possible that a plurality of compound cameras are connected to the controller 12 to be controlled by the controller 12.

First of all, a description will be given hereinbelow of a general operation of the compound camera.

In this compound camera, the output pulses of the encoder 25 for detecting the rotation of the motor 24 in a panning direction is sent to the motor control section 22, and a point of time at which the home-position element 32 has detected the pan origin is communicated through the Hall element signal detecting section 31 to the motor control section 22. When the number of pulses to be outputted from the encoder 25 while the rotatable pan table 103 makes one revolution (during one revolution of rotatable pan table 103) is taken as p, the motor control section 22 counts the number m of output pulses of the encoder 25 from when the Hall element 32 has detected the pan origin to calculate the present pan angle P1 according to the following equation. The present pan angle Pi calculated thus is preserved in the memory 47.

$$Pi=m\times 360/p$$

Likewise, the output pulses of the encoder 29 which detects the rotation of the motor 28 in a tilt direction are forwarded to the motor control section 22, and the point of time at which the tilt end point has been detected by the end-point Hall element 33 is communicated through the Hall element signal detecting section 31 to the motor control section 22. When the number of pulses to be outputted from the encoder 29 while the rotatable tilt table 105 makes half a revolution (during half revolution of rotatable tilt table 105) is taken as q, the motor control section 22 counts the number n of output pulses of the encoder 29 from when the end-point Hall element 33 has detected a tilt end point, and calculates the present tilt angle Ti according to the following equation.

$$Ti=90-(n\times 180/q)$$

That is, the tilt angle is taken as 0 when the camera 102 follows the right-under direction (just downwardly) and the tilt angle is calculated with respect to the right-downward direction. The possible tilt angle ranges from +90 degrees to −90 degrees. The present tilt angle Ti calculated is retained in the memory 47.

These pan angle Pi and the tilt angle Ti indicate the present direction of the center of the camera face (picture).

Furthermore, the field angle (angle of view) of a picture to be photographed depends upon the rotating quantity of the stepping motor 36 determining the zooming quantity of the lens section or the electronic zoom magnification, while the rotating quantity thereof depends upon the number of pulses to be outputted to the stepping motor 36. When counting a pulse for rotating the stepping motor 36, the lens control section 34 counts it as "plus" when the stepping motor 36 is rotated forwardly, while counting it as "minus" when the stepping motor 36 is rotated reversely, thus cumulatively calculating the number of pulses outputted from the motor driver 35. The camera control section 21 expresses, in the form of tilt coordinates, the vertical field angle (Zt) of the field angle obtained from the cumulative number of pulses or the electronic zoom magnification, and expresses the horizontal field angle (Zp) in the form of pan coordinates, with these field angle components being stored in the memory 47.

In this way, the values Pi, Ti, Zt and Zp are preserved in the memory 47 as data representative of the present quantity of state of the compound camera.

The operation of the compound camera (designated at numeral 11 in FIG. 13) lies under control of the controller 12 or the personal computer 19. In the compound camera 11, when the controller 12 or the personal computer 19 transmits a command, and upon receipt of the command therefrom, the camera control section 21 interprets the received command to control the respective portions.

Figure 14:
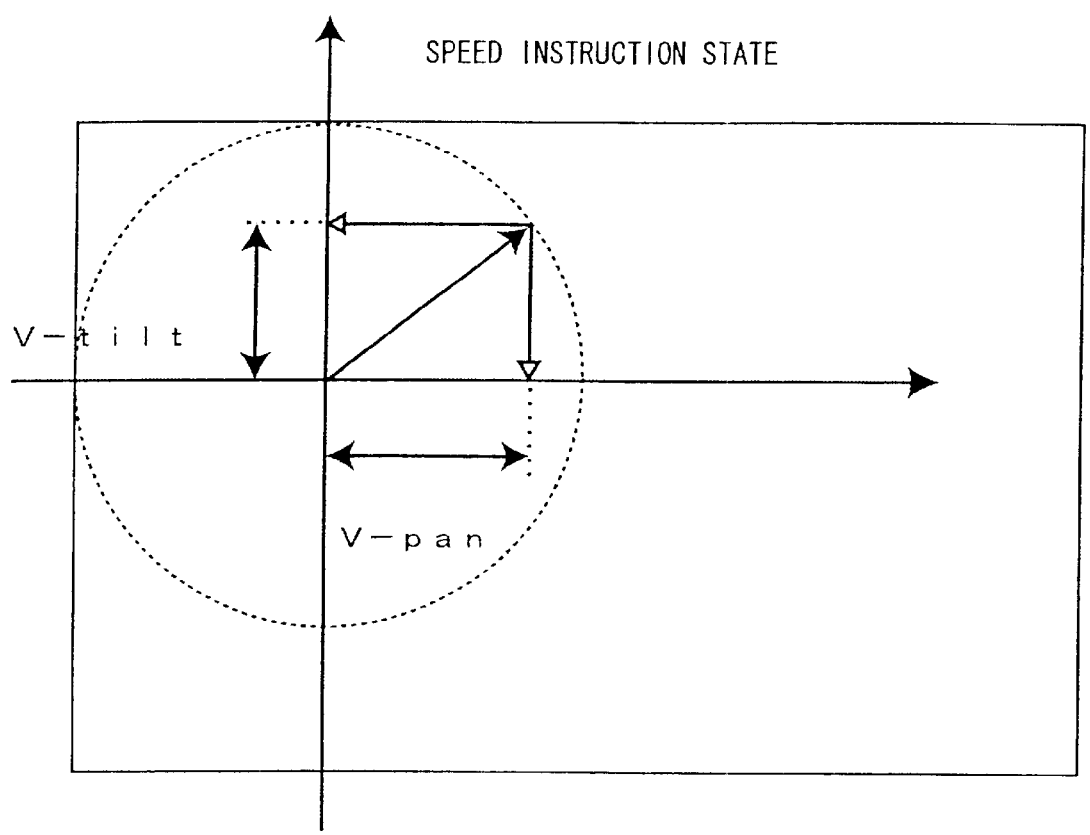
FIG. 14 is an illustration for describing camera speed control in a compound camera system.
Figure 15:
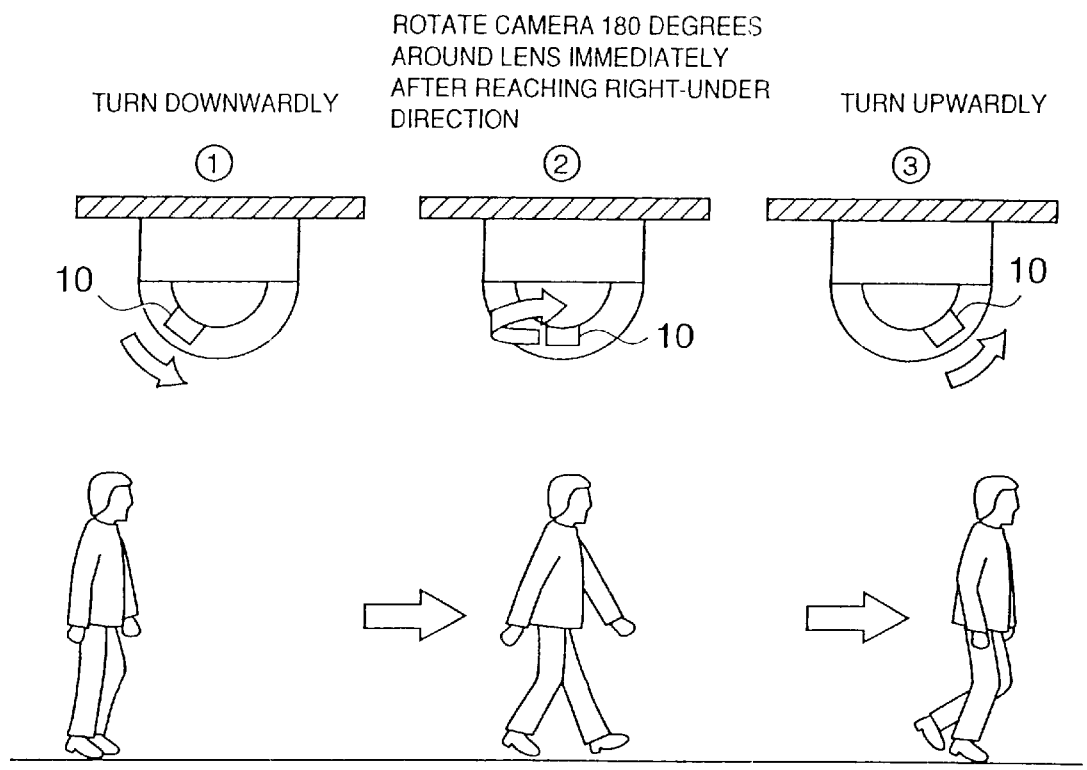
FIG. 15 is an illustration for describing an operation of a compound camera system.

When an operator inclines the joystick 14 of the controller 12 for changing the camera facing direction, in response to this manipulation, the controller 12 sends a command for camera moving speed control to the compound camera 11 and transmits data Vpan indicative of an x-axis component of the inclination of the joystick 14 and data Vtilt indicative of a y-axis component thereof, shown in FIG. 14, to the compound camera 11. In the compound camera 11, the camera control section 21 interprets the received command, and sends the data Vpan and the data Vtilt to the motor control section 22. The motor control section 22 controls the motor driver 23 so that the camera panning rotation is made at a speed corresponding to the data Vpan and further controls the motor driver 27 so that the camera tilting rotation is made at a speed corresponding to the data Vtilt.

When the operator returns the joystick 14 to the neutral position, the controller 12 similarly sends a command and data representative of Vpan=0 and Vtilt=0 to the compound camera 11, thereby ceasing the camera rotation in the tilting direction and in the panning direction.

At a change of the camera direction, the data Pi, Ti, Zt and Zp representative of the present quantity of state, as mentioned above, are updated and preserved.

The CCD 44 picks up an image in the direction the camera 102 takes, and outputs a video signal corresponding to the image picked up to the DSP 45. The DSP 45 is for encoding an image, with the encoded image data being once written in the image memory 46 and then read out from the image memory 46 to be outputted to the monitor 13.

In this compound camera system, the facing of the camera 102 in the opposite direction is realizable by changing the pan angle by 180 degrees without changing the tilt angle, or by changing the tilt angle from the "plus" direction to the "minus" direction in a state where the pan angle remains intact. However, although the former does not cause inversion in the CCD 44, the latter leads to vertical (upside-down) inversion in the CCD 44. Therefore, in the case of the latter, there is a need to read out the data inversely from the image memory 46; otherwise, the image appears upside down. Accordingly, the image data in the CCD 44 is put in the image memory 46 in like manner, but it is then read out invertedly from the image memory 46 and forwarded to the monitor 13. This state, that is, a state in which the data Ti assumes a minus condition (value), will be referred to hereinafter as a "vertical inversion state".

Likewise, the horizontal 90-degree rotation of the camera 102 is achievable by changing the pan angle by 90 degrees without changing the tilt angle, or by once returning the tilt angle to zero and then by enlarging the tilt angle 90 degrees in a different direction in the pan angle fixed condition. In the case of the latter, there is a need to read out the image data in the CCD 44 through the image memory 46 in the right-and-left inverted condition. This state will be referred to hereinafter as a "horizontal inversion state".

Figure 1:
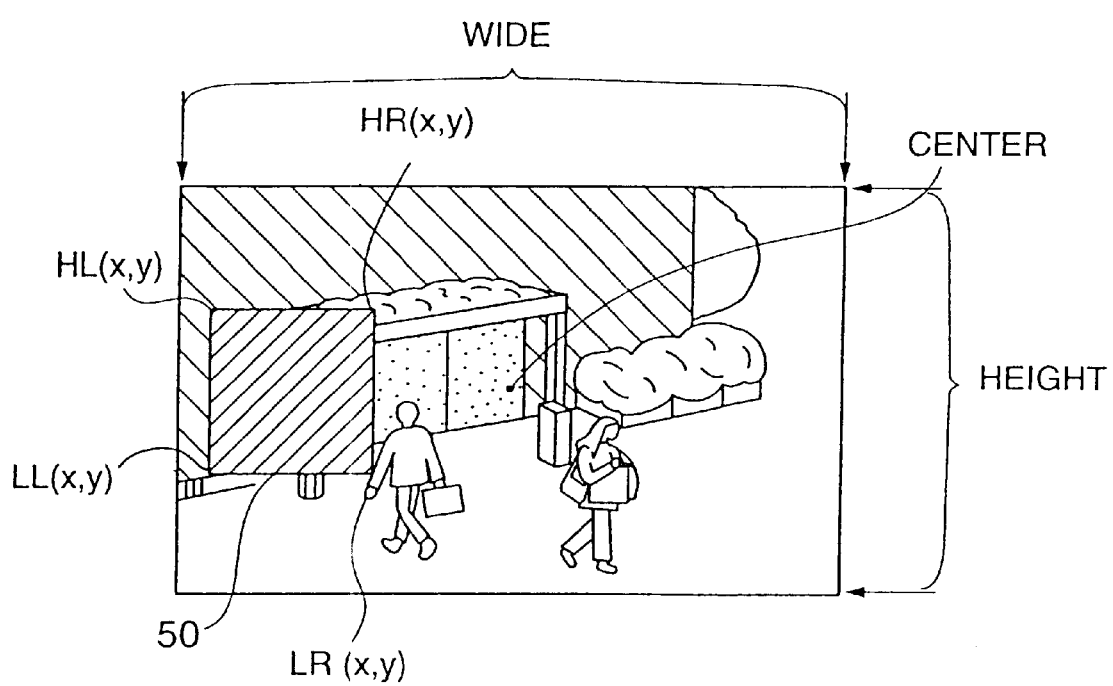
FIG. 1 is an illustration of a partially masked display of a picture taken by a compound camera system according to an embodiment of the present invention.

Furthermore, as FIG. 1 shows, this compound camera system is designed so that a privacy zone appearing in a picture is covered with a mask 50. In a case in which a picture is taken while the photographing direction is changed slowly by means of the automatic tracing, the mask position varies in accordance with the camera movement to cover the privacy zone on the screen (scene) continuously. However, in the compound camera system according to this embodiment, when the camera moving speed exceeds a certain value, even if a mask is absent, difficulty is experienced in identifying the privacy zone in the picture. Therefore, the privacy zone is not covered with the mask. In addition, the masking region is not located in a tilt angle range between −45 to 45 degrees. This is, as will be mentioned later, because, when the tilt angle is small, a subject rotates in a relatively large quantity due to the pan rotation and, hence, a mask cannot work effectively, and because, if a privacy zone exists at a position in such a tilt angle range, in general a monitor camera is not installed at that position.

The mask setting is made as follows through the use of the personal computer 19.

When an operator selectively derives a mask setting procedure from the personal computer 19 so that a mask setting command is sent therefrom to the compound camera system. In the compound camera system, the camera control section 21 interprets this command and gives an instruction for the maximum zoom to the lens control section 34. At this time, a picture taken by this camera system and the data Pi, Ti, Zp and Zt representative of the quantity of state thereof are fed to the personal computer 19, with the picture appearing on a screen thereof.

When the operator uses a mouse to designate the central position of a privacy zone in that picture, the personal computer 19 calculates the pan coordinates and the positive tilt coordinates corresponding to that central position and sends the calculation results to the compound camera system. In the compound camera system, the camera control section 21 gives a command to the motor control section 22 so that the center of the screen of the personal computer 19 turns at the pan coordinates and the tilt coordinates. In consequence, the central position of the set mask lies at the center of the screen of the personal computer 19.

Figure 3:
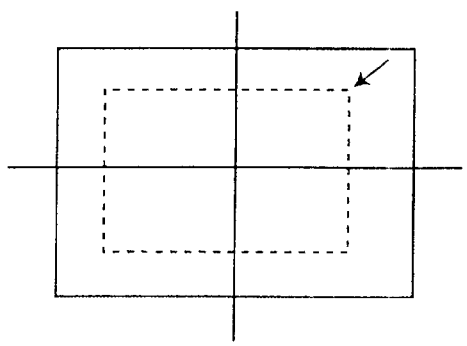
FIG. 3 is an illustration of masking zone setting on a screen in a method of displaying a picture from the compound camera system according to the embodiment of the invention.

Following this, when the operator shifts the cursor on the screen thereof, as FIG. 3 shows, a rectangular zone frame established in a manner that the cursor position forms one corner appears, where the central position of a mask to be set coincides with the center of the frame. The ratio of the vertical axis to the horizontal axis (aspect ratio) of this zone frame is fixed to 3:4 identical to that of the screen. After enlarging the zone frame to cover the privacy zone, the operator performs a mask zone setting operation. At this time, a number or name indicative of the mask zone is additionally set therein.

The data on the center coordinates and the coordinates of one vertex defining the set mask zone, together with the number thereof, is managed in the personal computer 19. Additionally, the pan coordinates and the tilt coordinates representative of that mask zone, together with the number thereof, are fed from the personal computer 19 to the compound camera system and put in the memory 47. In the display, a maximum of four mask zones can be set on the screen.

At this time, the personal computer 19 calculates coordinate data on three corners of the mask zone as a function of the center coordinates and the coordinates of one vertex forming the management data related to the mask zone, and sends the calculated coordinate data to the compound camera system. Alternatively, it is also appropriate that the center coordinates and the coordinates of one vertex forming the management data on the mask zone are fed to the compound camera system, where these management data are stored and, when needed, used to calculate the coordinate data on the four corners of the mask zone.

Figure 4A:
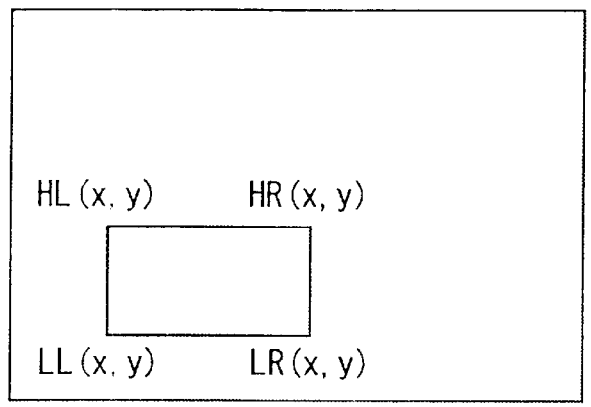

FIGS. 4A and 4B are illustrations of data to be stored in the memory 47 of the compound camera system in conjunction with one mask zone. With respect to one mask zone, are stored three data (that is, HLy, LLy, HRy, HLx, LLx, HRx as shown in FIG. 4B) corresponding to the left upper end HL, the left lower end LL and the right upper end HR shown in FIG. 4A. The right lower end LR data is calculated according to LRx=HRx, LRy=LLy.

Incidentally, the reason for setting the mask zone at the center of the screen is to prevent the distortion of a picture at the setting. Additionally, the reason for fixing the aspect ratio of the zone frame is to lessen the volume of data to be managed.

Figure 2:
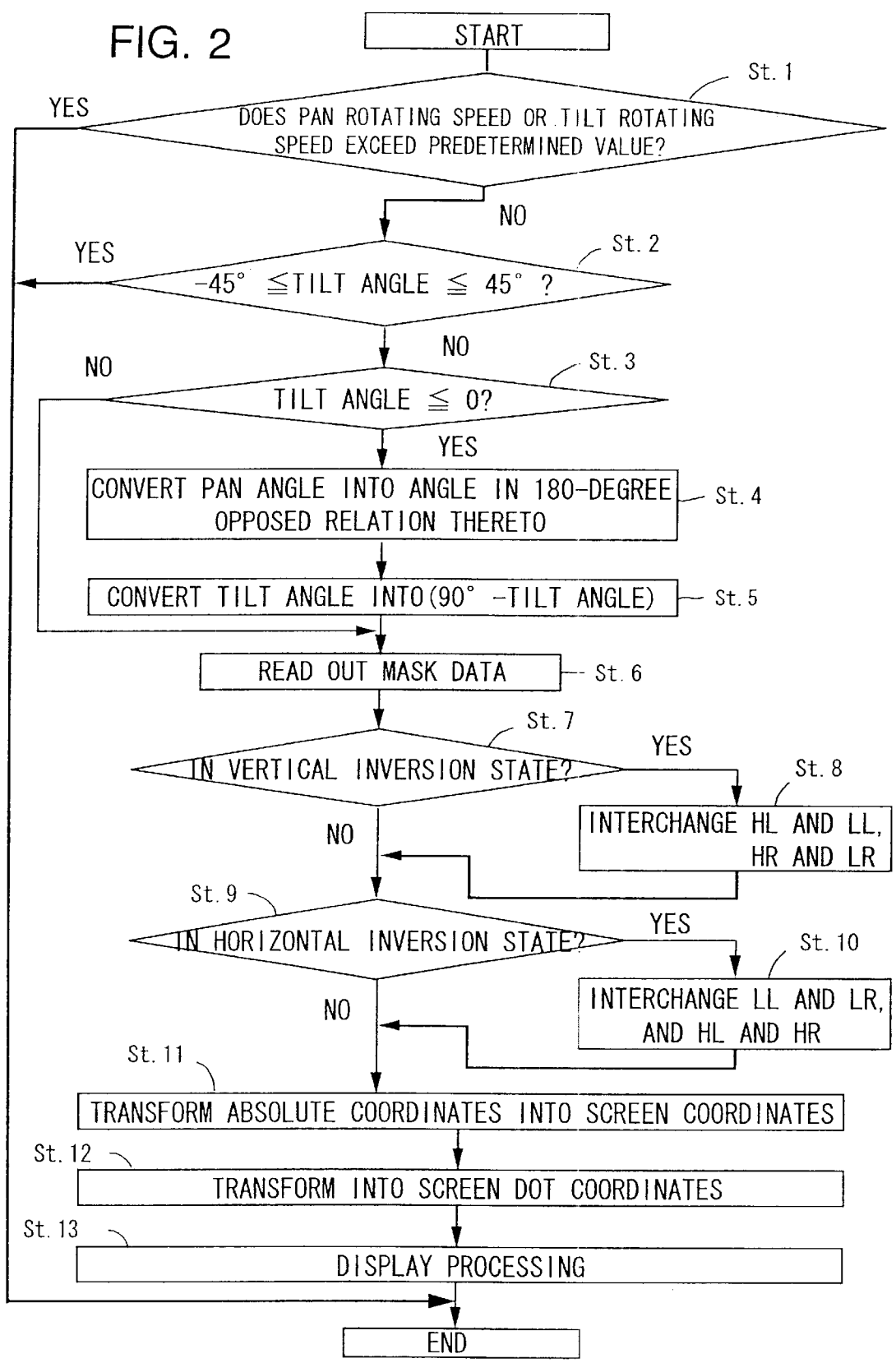
FIG. 2 is a flow chart showing an operation of the compound camera system according to the embodiment of the invention.

Furthermore, a description will be given hereinbelow of privacy zone display processing operation after the setting of a mask zone in the compound camera system. FIG. 2 is a flow chart showing the operation in the compound camera system.

In the flow chart of FIG. 2, in a step 1, the camera control section 21 examines whether or not the panning speed or the tilting speed equals or exceeds a predetermined speed. If the answer of the decision step 1 shows that the panning speed or the tilting speed equals or exceeds the predetermined speed, the camera control section 21 terminates this operation without conducting the privacy zone display processing operation. On the other hand, if the decision step 1 shows that the panning speed or the tilting speed does not reach the predetermined speed, the operational flow advances to the next decision step 2.

The decision step 2 is for checking whether or not the tilt angle Ti is between −45 degrees and 45 degrees (−45° ≦tilt angle<45°). If the answer of the decision step 2 shows that the tilt angle Ti is between −45 degrees and 45 degrees, the camera control section 21 also terminates this operation without conducting the privacy zone display processing operation. On the other hand, If the answer of the decision step 2 shows that the tilt angle Ti is out of the range between −45 degrees and 45 degrees, the operational flow proceeds to a further decision step 3.

The decision step 3 is for checking whether or not the tilt angle Ti assumes a negative or minus value (tilt angle≦0). If the decision in this step 3 indicates "YES" (affirmative), the operational flow jumps to a step 6. Otherwise, the step 3 is followed by a step 4 to convert the pan angle Pi into an angle in 180-degree opposed relation thereto.

That is, in the step 4, in the case of Pi<180°, an angle (Pi+180°) is set as a pan angle, when Pi≧180°, an angle (Pi−180°) is set as a pan angle.

After the execution of the step 4, the operational flow advances to a step 5. The step 5 is for converting the tile angle into (90°−Ti). That is, the processing of the steps 4 and 5 accomplishes the transformation into absolute pan coordinates (0 to 360°) and absolute tilt coordinates (0 to 180°).

Thereafter, in a step 6, the camera control section 21 reads out mask data from the memory 47, and in a decision step 7, checks whether or not the compound camera system is currently in the vertical inversion state. If the answer of the decision step 7 indicates the vertical inversion state, a step 8 follows to interchange the left upper end data HL and the left lower end data LL in the mask data, and further to interchange the right upper end data HR and the right lower end data therein.

Figure 5A:
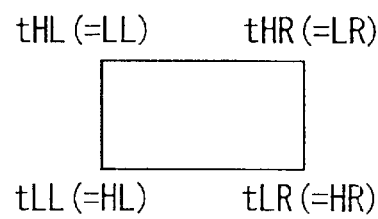
FIGS. 5A and 5B are illustrations of a coordinate transformation at vertical inversion in the compound camera picture displaying method according to the embodiment of the invention.
Figure 5B:
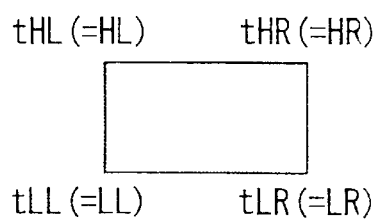

FIG. 5A is an illustration of data (tHL, tLL, tHR, tLR) after the interchange processing, while FIG. 5B is an illustration of data for when the interchange processing is unnecessary.

Furthermore, a decision step 9 is implemented to check whether or not the horizontal inversion state is going on currently. If the answer of the decision step 9 indicates the horizontal inversion state, a step 10 follows to interchange the left lower end data LL and the right lower end data LR and further to interchange the left upper end data and the right upper end data HR.

Figure 6A:
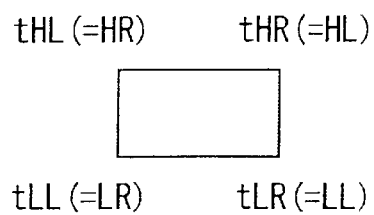
FIGS. 6A and 6B are illustrations of a coordinate transformation at horizontal inversion in the compound camera picture displaying method according to the embodiment of the invention.
Figure 6B:
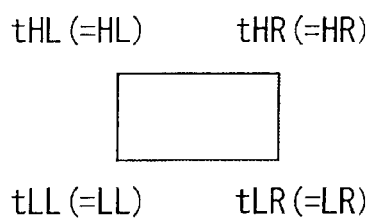

FIG. 6A is an illustration of data (tHL, tLL, tHR, tLR) after this interchange processing, while FIG. 6B is an illustration of data for when the interchange processing is unnecessary.

Figure 7A:
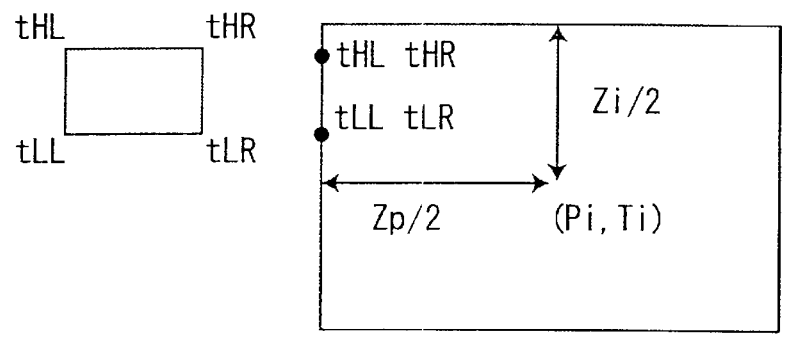
FIGS. 7A to 7C are illustrations of a transformation into a screen coordinate in the compound camera picture displaying method according to the embodiment of the invention.
Figure 7B:
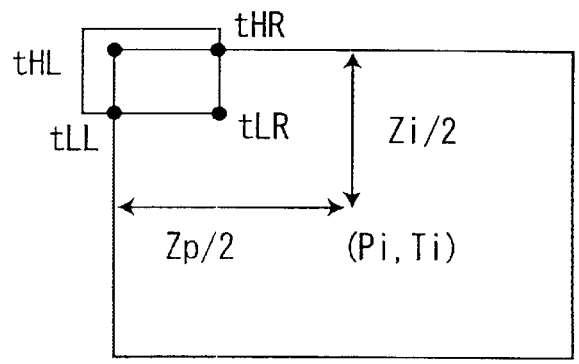
Figure 7C:
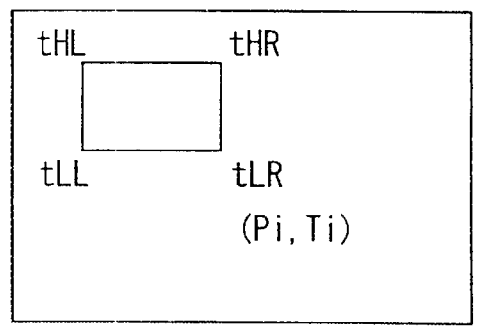

Still furthermore, in a step 11, the camera control section 21 converts the mask data, expressed with the absolute coordinates, into screen coordinates. As FIGS. 7A to 7C show, this is transformation processing for paning (setting) the mask zone (tHL, tLL, tHR, tLR) in the present screen whose center is at (Pi, Ti), and horizontal and vertical lengths are taken to be Zp and Zt, respectively. As FIG. 7A shows, if the mask zone is out of the present screen, the data tHL and tHR, tLL and tLR are transformed into points on the border lines of the present screen (tHL=tHR, tLL=tLR), and no display of the mask zone takes place.

Furthermore, as FIG. 7B shows, if a portion of the mask zone is out of the present screen, the deviation mask zone data (tHL, tHR, tLL) are transformed into points on the border lines of the screen so that a zone partitioned by the points obtained by the transformation and the data tLR is displayed as a mask zone.

Still furthermore, as FIG. 7C shows, in a case in which all the mask zone data lie within the present screen, a display of an area partitioned by the data (tHL, tLL, tHR, tLR) appears as a mask zone.

Following this, a step 12 is implemented to convert the mask zone, transformed into the screen coordinates, into data corresponding to the pixels of the CCD 45, with the converted data being outputted to the DSP 45. Then, the operational flow enters display processing. This mask zone is display in color such as black on the screen, and is displayed together with a mask number, symbols (private house mark, toilet room mark or the like) and other marks according to the circumstances.

For correction of this mask zone, the operator inputs a mask number and implements a mask setting procedure. The camera control section 21 of the compound camera system reads out the mask data corresponding to the inputted mask number from the memory 47, and controls the motor control section 22 so that the mask zone appears at the central portion of the screen. In a state where the mask zone exists at the central portion of the screen, the operator conducts an operation such as panning/tilting or zooming, which erases the mask zone so that new zone setting becomes possible.

Figure 8:
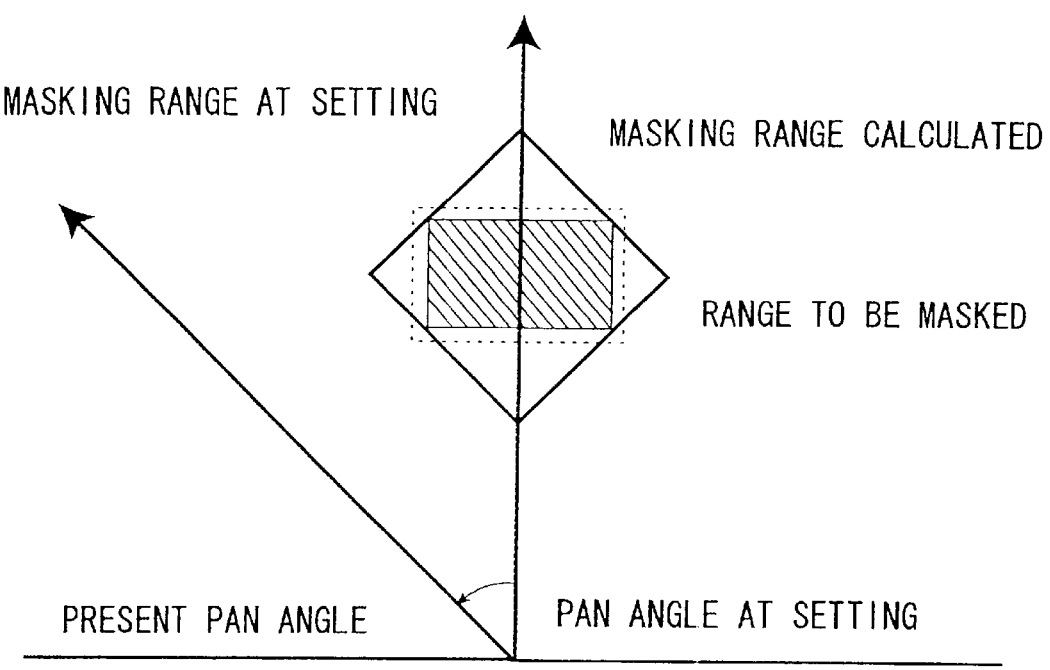
FIG. 8 is an illustration useful for explaining a correction of a mask involved in a panning rotation in the compound camera picture displaying method according to the embodiment of the invention.

Furthermore, as FIG. 8 shows, even if a subject is in a fixed condition, a picture of the subject rotates in the screen in connection with the pan rotation. This variation occurs more greatly as the tile angle approaches an angle at which the camera follows the right-under direction. Therefore, when the pan angle varies from the angle at the mask setting, the privacy zone rotates in the screen so that a portion thereof becomes out of the mask to be visible. This problem is avoidable by calculating a mask zone needed for covering the present privacy zone (that is, the mask position at the mask zone setting) on the basis of the pan angle at the mask zone setting and the present pan angle to update the mask zone.

In addition, a large field angle can obviate a possibility of violating the privacy even if a small mask disappears. Accordingly, it is also appropriate to ON/OFF-control (make/cease) the masking according to a field angle. Still additionally, it is also appropriate to execute control so that a mask which becomes smaller than a predetermined value on a monitor screen does not become further smaller. This control can lighten the arithmetic processing for changing the mask area in connection with a field angle. Incidentally, there is a possibility that an extremely small mask is misunderstood as a defect or failure.

Furthermore, in a case in which the camera rotating speed is high, the masking is stopped as mentioned above. This is because additional consideration is given to the fact that the mask zone coordinate calculation cannot catch up with the high camera rotation. On the contrary, it is also appropriate to control the camera rotating speed for enabling the masking calculation to follow it.

Still furthermore, the personal computer 19 has a function to count the number of times of masking (the number of masks) and, when the number of times of masking exceeds a predetermined value, inhibits further setting of a mask zone. A high frequency defies the follow-up of the processing in the compound camera system. In this case, it is also possible to cover a plurality of mask zones with one mask, thereby decreasing the number of times of masking. Additionally, in a case in which a plurality of masks are set in one scene, it is also appropriate that these masks are converted into a large mask including all of these masks prior to the masking processing, which can shorten the processing time.

Moreover, in this embodiment, the cancellation and setting of a mask can be made through the use of a right password assigned to only a specific person, thereby preventing an operation by another person.

Still moreover, in this embodiment, although, for easy management of mask zone data, a mask zone is set with the center coordinates and one vertex of a rectangle, it is also possible to use two vertexes of a left lower vertex and a right upper vertex or to use the center coordinates and a contour or configurational size parameter such as a mask radius.

Furthermore, in the above description, although this embodiment relates to a monitor camera system in which a camera can rotate 360 degrees in a panning direction and rotate 180 degrees in a tilting direction, the present invention is also applicable to a monitor camera system which performs different pan rotation and tilt rotation.

As described above, since the monitor camera system and displaying method according to the present invention are designed to mask only an area on a screen needed for protection of privacy, it is possible to protect the privacy without impairing its function.

In addition, in this monitor camera system, mask data exists on the camera side, which prevents a delay on control stemming from transmission delay, thus providing high responsiveness and exhibiting high response performance.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A monitor camera system comprising:
   a monitor camera rotatable in panning directions and in tilting directions; and
   control means for controlling said monitor camera, said monitor camera holding mask data to be used in masking a privacy zone predetermined in a picture taken by said monitor camera, said control means forming a mask zone based on the mask data so that the mask zone covers the privacy zone of the picture, thereby displaying the picture while masking the privacy zone by the mask zone.

2. The monitor camera system according to claim 1, wherein said control means sets said mask data through the use of a contour parameter of a configuration of a mask zone for covering said privacy zone.

3. The monitor camera system according to claim 2, wherein the setting of said mask data is made on a central portion of said picture taken by said monitor camera.

4. The monitor camera system according to claim 2, wherein said control means uses, as said contour parameter, center coordinates and size coefficient of said mask zone configuration for setting said mask data.

5. The monitor camera system according to claim 2, wherein said control means uses, as said contour parameter, center coordinates of said mask zone configuration and a radius of said mask zone configuration for setting said mask data.

6. The monitor camera system according to claim 1, wherein said monitor camera holds said mask data produced on the basis of center coordinates and one or more contour size parameters of said mask zone configuration.

7. The monitor camera system according to claim 2, wherein said control means uses, as said contour parameter, coordinates of a left upper vertex and a right lower vertex of said mask zone configuration for setting said mask data.

8. The monitor camera system according to claim 1, wherein the masking is inhibited in a region in which a tilt angle is below a predetermined value.

9. The monitor camera system according to claim 1, wherein said control means manages a number of masks included in one scene taken by said monitor camera, and inhibits the setting of masks, whose number exceeds a predetermined value, in the one scene.

10. The monitor camera system according to claim 1, wherein said mask data, together with a number or name indicative of a mask zone for covering said privacy zone, is held in said monitor camera.

11. The monitor camera system according to claim 10, wherein, when receiving said number or said name from said control means, said monitor camera provides a display of a mask zone determined by said mask data held together with said number or said name.

12. The monitor camera system according to claim 11, wherein, when receiving said number or said name from said control means in a mask correction mode, said monitor camera provides a display of a mask zone corresponding to said number or said name.

13. The monitor camera system according to claim 1, wherein said monitor camera inverts vertically said mask data held therein when masking said privacy zone.

14. The monitor camera system according to claim 2, wherein setting or cancellation of said mask data is made only when a password is inputted to said control means.

15. The monitor camera system according to claim 1, wherein, when a position of said mask zone for covering said privacy zone deviates from a central position of a screen displaying a picture taken by said monitor camera, said monitor camera corrects a configuration of said mask zone.

16. The monitor camera system according to claim 1, wherein, when a plurality of mask zones appear in one scene, said monitor camera converts said plurality of mask zones into one enlarged mask zone prior to masking processing.

17. The monitor camera system according to claim 1, wherein, in a case in which a mask zone is set on a screen for displaying a picture taken by said monitor camera, said control means controls a moving speed of said monitor camera to a mask processing ability.

18. A method of displaying a picture taken by a monitor camera in panning directions and in tilting directions, said method comprising:
   holding mask data, said mask data being set through a use of a counter parameter of a configuration of mask zone for covering a privacy zone predetermined in the picture; and forming the mask zone based on the mask data so that the mask zone covers the privacy zone of the picture, thereby displaying the picture while masking the privacy zone by the mask zone.

19. The picture display method according to claim 18, wherein the masking is inhibited in a region in which a tilt angle is below a predetermined value.

20. The picture display method according to claim 18, wherein, when said mask zone deviates from a central portion of a screen for displaying the picture taken by said monitor camera, said mask zone configuration is corrected and displayed to cover the entire privacy zone.

21. The picture display method according to claim 18, wherein the masking is stopped when a moving speed of said monitor camera exceeds a predetermined value.

22. The picture display method according to claim 18, wherein a number or name is related to said mask data to be displayed together with said mask zone.

23. The picture display method according to claim 22, wherein said mask zone is displayed in response to an input of said number or said name for correction of said mask zone.

* * * * *